United States Patent [19]

Duport

[11] Patent Number: 4,701,153
[45] Date of Patent: Oct. 20, 1987

[54] DOUBLE-ACTION BELT INTENDED PARTICULARLY FOR A SPEED VARYING DEVICE COMPRISING PULLEYS OF VARIABLE USEFUL DIAMETER

[76] Inventor: Louis Duport, 109, rue Colbert, 92700 Colombes, France

[21] Appl. No.: 860,742

[22] Filed: May 7, 1986

[30] Foreign Application Priority Data

May 20, 1985 [FR] France .................. 85 07573

[51] Int. Cl.⁴ .............................................. F16G 5/16
[52] U.S. Cl. ..................................... 474/201; 474/242
[58] Field of Search ............... 474/177, 178, 190, 191, 474/201, 242

[56] References Cited

U.S. PATENT DOCUMENTS

| 962,563 | 6/1910 | Foster et al. | 474/201 |
| 4,303,404 | 12/1981 | Moore | 474/242 |
| 4,428,740 | 1/1984 | Moore | 474/242 |
| 4,560,371 | 12/1985 | Hattori | 474/201 |
| 4,579,550 | 4/1986 | Walker | 474/201 |

FOREIGN PATENT DOCUMENTS

| 8304291 | 12/1983 | European Pat. Off. |
| 0124322 | 7/1984 | European Pat. Off. |
| 0118892 | 9/1984 | European Pat. Off. |
| 0125757 | 11/1984 | European Pat. Off. |
| 0153453 | 4/1985 | European Pat. Off. |
| 2821698 | 11/1978 | Fed. Rep. of Germany |
| 0073645 | 4/1984 | Japan | 474/201 |

Primary Examiner—James A. Leppink
Assistant Examiner—Terry Lee Melius
Attorney, Agent, or Firm—Louis Orenbuch; Paul Kudirka

[57] ABSTRACT

A double-action belt intended for use with speed varying devices of the type having pulleys of variable diameter is constructed of many rigid trapezoidal elements that are articulated one to another at their bases. The rigid elements all have a central opening through which an elastic member extends. The rigid elements are strung in a closed loop along the elastic member with each element being held captive by the stretchable elastic member. The sides of the rigid trapezoidal elements which are opposite the articulated base carry protruding flanges. Those protruding flanges abut when the rigid elements are pressed together and cause the central portions of contiguous rigid elements to be spaced apart to accommodate those segments of the elastic member situated between contiguous rigid elements.

4 Claims, 6 Drawing Figures

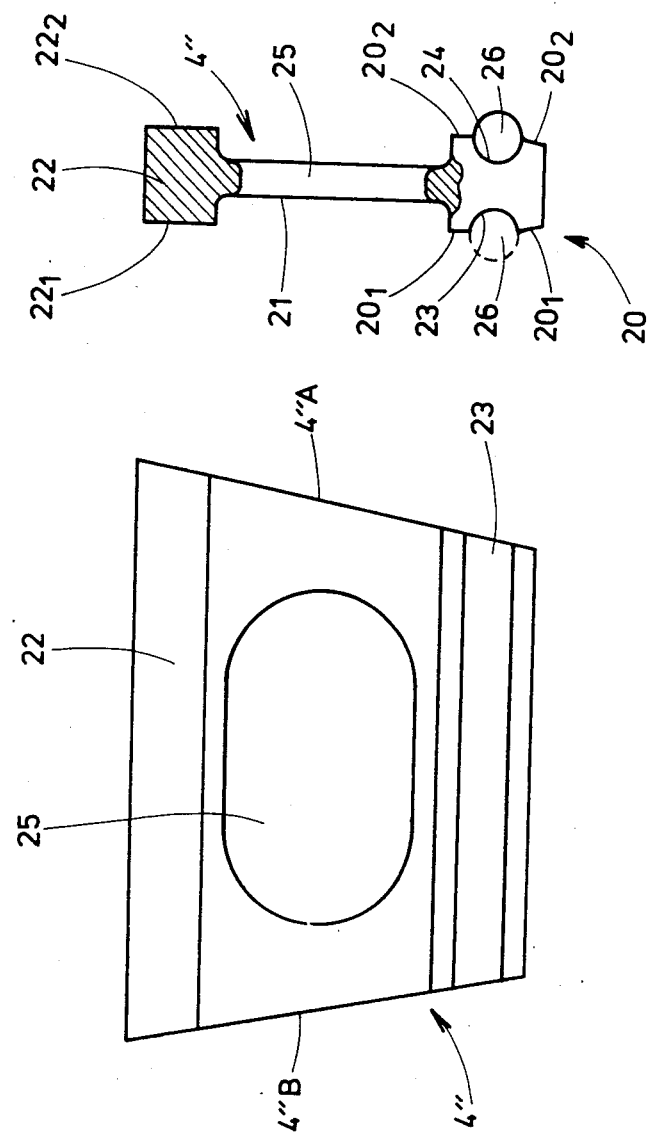

DOUBLE-ACTION BELT INTENDED PARTICULARLY FOR A SPEED VARYING DEVICE COMPRISING PULLEYS OF VARIABLE USEFUL DIAMETER

The present invention relates to a double-action belt intended particularly for a speed varying device comprising pulleys of variable useful diameter.

At technical and economic level, it would be desirable to replace the fixed-ratio gearbox of a transmission by a speed varying device which makes it possible for the engine still to operate at its optimum speed either with regard to fuel consumption or in the interests of either flexibility or efficiency.

Various speed varying devices are already available, particularly the DAF device which employs two pulleys of variable diameter, one of the pulleys being connected to the output from the engine, the other to the shaft which supplies power to the driving wheels. These two pulleys are connected by a V-belt. The ratio between the engine speed and that of the wheels is altered by changing the useful diameter of the pulleys.

This V-belt, like the V-belts used, for example, to drive the water pump, the fan, etc., is a belt made from rubber or synthetic flexible material reinforced by a strengthener in the form of a cable embedded in the mass of rubber.

The DAF speed varying device is satisfactory. However, the materials from which it is possible to make the belts, particularly rubber, even when strengthened by a reinforcement, do not make it possible to transmit high levels of torque. Therefore, the DAF speed varying devices can only be used on small vehicles.

Also known is another speed varying device of the type mentioned at the outset (VAN DORNE speed varying device) which, instead of transmitting the torque via a belt working in traction, transmits this torque by compression via a stack of metal elements working under compression, this stack of metal elements passing over two pulleys of variable useful diameter according to their gear ratio.

This VAN DORNE device is composed of metallic elements having on both sides grooves to receive metallic guide blades which form a loop. These blades do not participate in the transmission of the torque but are intended solely to guide the plates along the path which is thus defined. These guide blades are free and change shape according to the useful diameter of the pulleys.

This system has been applied to vehicles making it possible to transmit torques of 120 Nm and even of the order of 180 Nm, that is to say engines with a capacity of around 2 liters.

This device working by compression is interesting. However, it is relatively tricky to produce on account of the guide blades which must maintain the stacked elements in the portion of this system which is operating under compression.

The purpose of the present invention is to create a device of the V-belt type which makes it possible to transmit torque between two pulleys of variable useful diameter in such a way as to work under compression and under tension.

To this end, the invention relates to a double action belt of the type mentioned above, characterised in that it is constituted by:

an assembly of rigid elements of trapezoidal cross-section corresponding to the cross-section of the pulleys, each element having a base, an intermediate part and a flange, the elements being articulated to one another at their base and the flanges having surfaces by which two consecutive elements can bear one against the other, and an elastic component connecting the elements at least at the level of their intermediate part.

Such a rigid belt makes it possible to work in compression and in tension, which facilitates the construction of pulley-type speed varying devices in which the belt constitutes the main element.

The structure of the belt according to the invention and the fact that it works on a double-action principle make it possible to produce a very acceptable belt which is capable of transmitting relatively high torque levels for the engines of medium or high-powered motor vehicles without limiting the use of such a speed varying device to a very low powered engine. Furthermore, a double-action belt according to the invention can likewise be used advantageously on speed varying devices of low powered vehicles because in this case it avoids the problems of belt replacement.

According to another characteristic feature, the intermediate part of the elements has a surface which is reduced in relation to the overall trapezoidal surface area of the element to allow space for the elastic component.

The elastic component of the belt thus forms a continuous element over the entire length of the belt and contributes to the strength of the belt, its adhesion, the regular transmission of stresses and the gentleness of operation.

According to another characteristic feature of the invention, the element comprises at its base bearing sleeves intended to be combined respectively with the homologous sleeves of an upstream element and of a downstream element via an articulating axis.

The elements can thus be joined by articulations in the manner of hinges. The base therefore constitutes a chain which reinforces the belt in traction and allows the flanges to maintain bearing contact to transmit the stresses under compression.

According to a particularly advantageous solution, in the embodiment described hereinabove, the element comprises a median bearing sleeve and two sleeves which, viewed from the front, are situated on either side of the median sleeve.

According to another characteristic feature of the invention, the element comprises at its base on either side a semi-cylindrical housing to receive a part of an articulating spindle.

In the case of the embodiment described hereinabove, it is particularly interesting that the faces of the base are reduced in size and only leave spindle housings which are of dimensions smaller than those of a half-cylinder so that it is possible to bring together the bases during moulding of the elastic component in order to induce an internal tension for the elastic component.

It is particularly advantageous if the rigid elements are of metal. These elements could also be of a very strong synthetic material.

Machining of these elements and more generally their manufacture present no difficulty so that they can easily be mass produced.

According to another characteristic feature of the invention, the theoretical cross-section of an element according to a plane parallel with the median plane of the belt is a rectangular cross-section. This means that the geometrical axes of spindles which fit into the housings in the base connecting or articulating two elements one on the other are situated in the extension of the bearing faces of the flanges. Thus, the strand of the belt which is in compression adopts a rectilinear form which corresponds to the best conditions for transmission of the compression stress.

According to another characteristic feature, the invention likewise relates to a method of manufacturing a double-action belt such as that described hereinabove. According to this method, the theoretical cross-section of the element is made with a rectangular cross-section.

The present invention will be described in greater detail hereinafter with reference to the accompanying drawings, in which:

FIG. 4 is a side view in section of a second embodiment of a belt element according to the invention;

FIG. 5 is a front view of the element shown in FIG. 4 and

Figure 6:
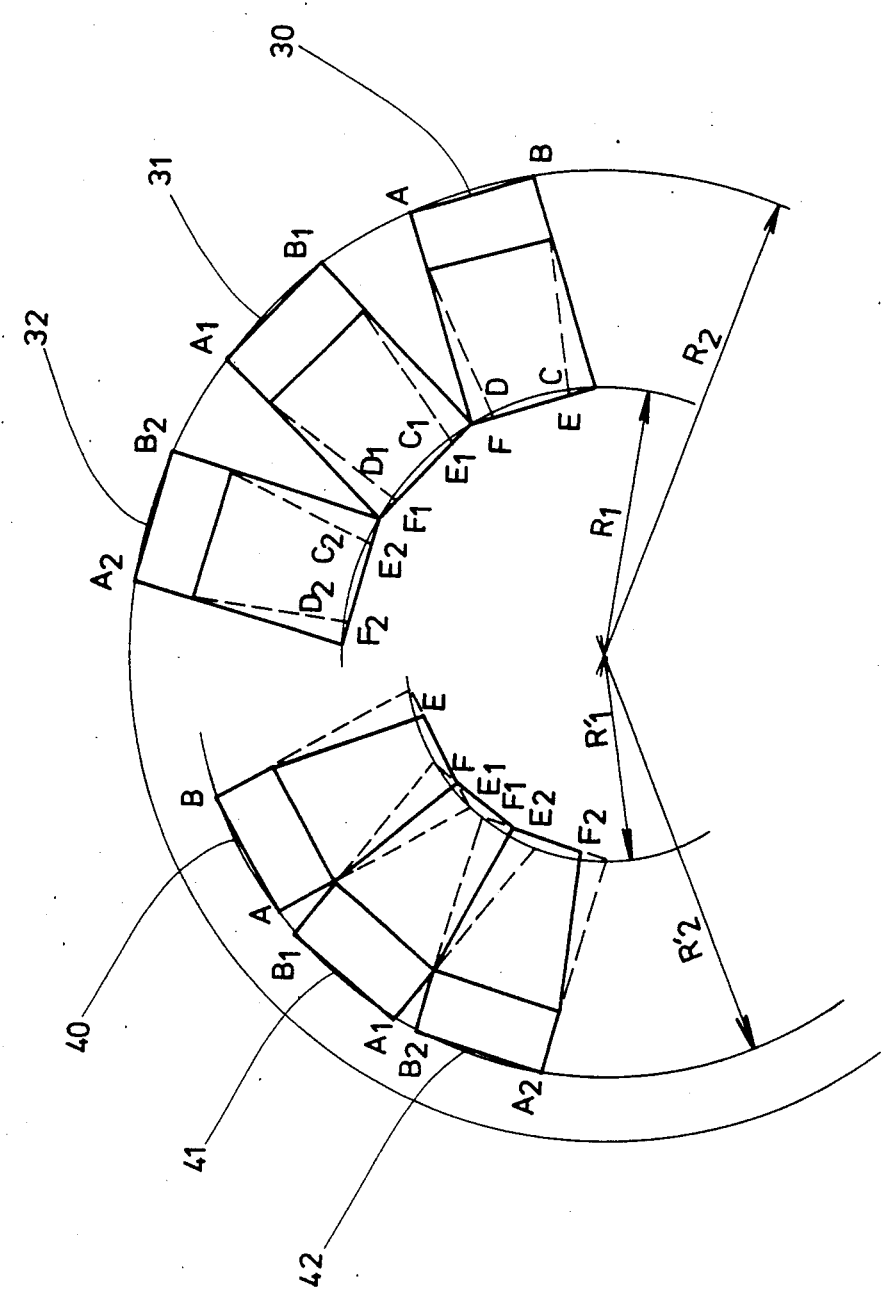

FIG. 6 diagrammatically shows the method of manufacturing a belt according to the invention.

Figure 1:
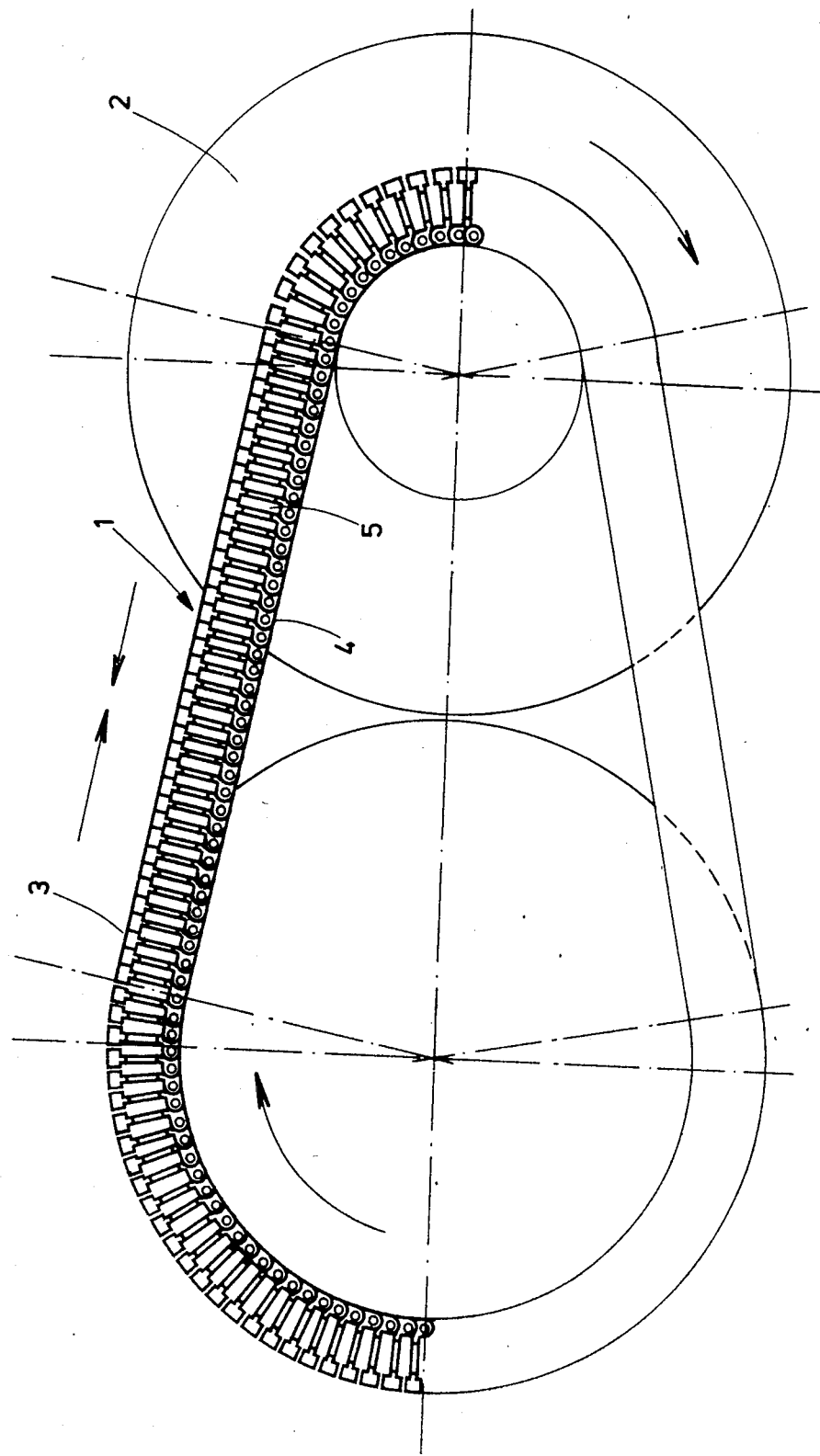
FIG. 1 is a diagrammatic view of a double-action belt passing over two pulleys of variable diameter.

According to FIG. 1, the double-action belt of the invention is represented as being applied to a speed varying device comprising a pulley of variable useful diameter. This belt 1 passes over a first pulley 2 and a second pulley 3. The first pulley is shown with a small useful diameter and the second pulley with a large useful diameter.

The double-action belt is composed on the one hand of an assembly of elements 4 of trapezoidal cross-section corresponding to the cross-section of the pulleys 2, 3. These elements 4 each comprise a base and a flange connected by an intermediate part and, moreover, an elastic component 5 provided at the level of the intermediate part of the elements and connecting these latter in resilient fashion.

Figure 2:
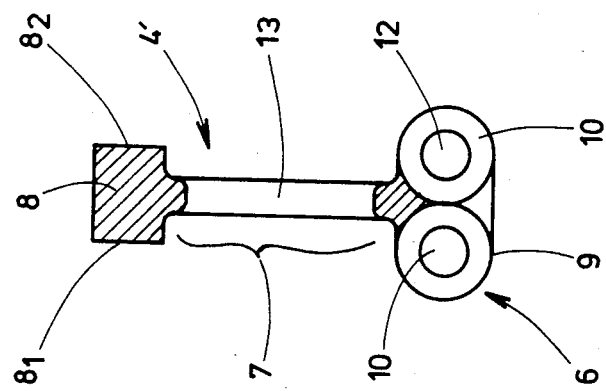
FIG. 2 is a side view in section showing a belt element according to the invention.
Figure 3:
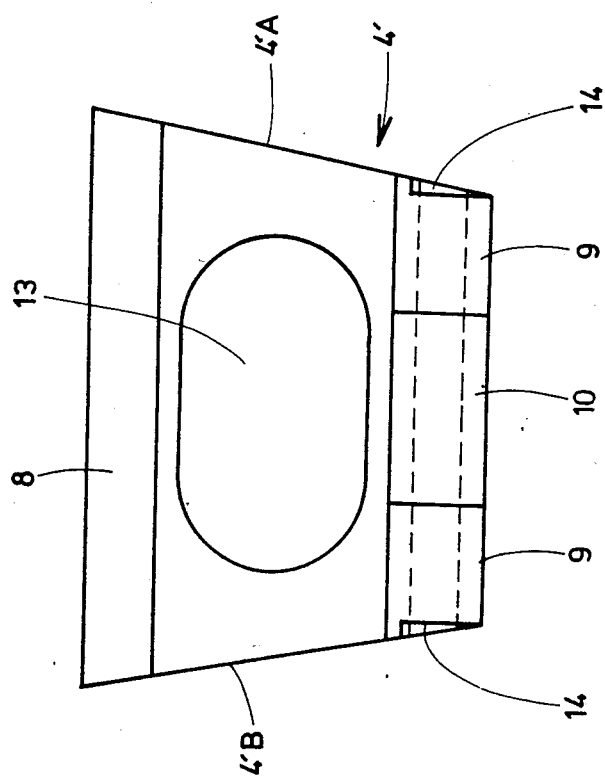
FIG. 3 is a front view of the element in FIG. 2.

According to FIGS. 2 and 3, a first example of embodiment of an element 4' consists of a base 6, a connecting part 7 and a flange 8. The base 6 consists of two cylindrical sleeves 9 which form bearings for front and rear spindles and a sleeve 10 forming an intermediate bearing for the two sleeves 9 and situated at the rear or front in relation to the sleeves 9. The two sleeves 9 are spaced apart by a distance equal to or greater than the length of the sleeve 10. The geometrical axes of the sleeves 9 are coaxial and parallel with the geometrical axis of the sleeve 10; these axes are at a right-angle to the plane of FIG. 2. The sleeves 9 have a housing 11 and the sleeve 10 has a housing 12.

The disposition of the bearing sleeves 8 and 9 is clearly shown in FIG. 3. Thus, the successive elements of the belt can be connected to one another by the placing of a spindle in the housing 10 and of a spindle in the housing 11.

Although the simplest way of articulating two consecutive elements 4 is via the connection between the two sleeves 9 of one element and the sleeve 10 of the element 4 following or preceding, other methods of articulation comprising a greater or smaller number of sleeves may be envisaged.

The intermediate part 8 (sic!) of the element 4' comprises a window 13 through which can pass the elastic component, not shown. In the upper part, the element comprises the flange 8, of which the faces 81, 82 front and rear in the direction of travel of the belt (FIG. 2) are substantially parallel.

Viewed from the front, the belt element 4' comprises a trapezoidal cross-section (FIG. 3) corresponding to the cross-section of the pulleys 2, 3.

According to FIG. 3, the bearing sleeves 9 have on their outer face which is towards the pulleys a respective notch 14 for the positioning and fixing of the spindle in the housings 10 and of its head, not shown.

FIGS. 4 and 5 show a second embodiment of an element of a double-action belt. This element 4' consists of a base 20, an intermediate part 21 and a flange 22. The base 20 has on its front and rear faces 201, 202 respectively two housings 23, 24 of substantially semi-cylindrical form so that each can receive a hinge spindle 26 which is shown diagrammatically.

As in the previous example, the intermediate part 21 comprises a window 25 for accommodating the elastic component, not shown.

The cross-section of this element is likewise trapezoidal, the angles of inclination of the lateral faces 4'A, 4"B corresponding to the angles of the pulleys 2, 3.

In contrast to the belt element 4' according to FIGS. 2 and 3, the element 4" shown in FIGS. 4 and 5 is not intended to be rigidly connected to the upstream and downstream elements 4" but only in articulated fashion using a free articulation consisting of small spindles 26 placed in the adjacent cavities 23, 24 of the belt elements 4".

Under the effect of the elasticity in the component which connects the various elements, the spindles 26 remain in position while ensuring their hinging function for the elements 4" when the belt is describing an arc of a circle as it passes over one or other of the pulleys 2, 3.

According to an alternative embodiment, not shown, the spindles 26 are replaced by a semi-cylindrical boss corresponding to the spindle 26 provided on one of the faces, for example the face 202, while the other face 201 comprises the housing 23.

Both with regard to the example in FIGS. 2 and 3 and that in FIGS. 4 and 5, it should be noted that the front and rear faces (71, 72, 221, 222) of the bases 7, 22 are substantially aligned with the geometrical axis of the housings 9, 10 or semi-cylindrical cavities 23, 24. In this way, each element 4, 4', 4" corresponds to a geometrical figure of rectangular cross-section. This assimilation to a rectangle is important in explaining an embodiment of belt such as that which will be described hereinafter:

The belt elements 4, 4', 4" are produced by various techniques such as machining from a profiled bar, for example by an automatic machining process, by injection moulding in the case of elements made from bronze or plastics material, by precision matrix production or by cutting.

The second phase of manufacture relates to the production of the elastic component on the elements thus produced. For this, the elements 4, 4', 4" are placed in a mould in which there is a housing in the form of a circular groove into which is poured the elastic material which is caused to polymerise or vulcanise on the above elements 4, 4', 4".

Two solutions may be envisaged, one being a process of moulding without prestressing while the other makes it possible to induce a prestress into the elastic component.

FIG. 5 diagrammatically shows these two methods of manufacturing a double-action belt according to the invention.

Shown in FIG. 6 are elements 30, 31, 32 which are illustrated diagrammatically by their rectangular contour (see FIGS. 2 and 4). In order the better to explain the characteristic features of the method, the rectangular contour has been greatly exaggerated: this rectangular shape is relatively compact whereas in reality the rectangular shape of the contour of an element is quite elongate.

The various elements 30, 31, 32 are identical. The peaks of the rectangle have been identified by references A, B, C, D, $A_1$, $B_1$, $C_1$, $D_1$, $A_2$, $B_2$, $C_2$, $D_2$. The base of the rectangle has been truncated on either side by a dotted line forming peaks E, F, $E_1$, $F_1$, $E_2$, $F_2$ for reasons which will become apparent later.

For moulding without prestressing, the elements 30, 31, 32, etc., are placed in a mould in the form of a crown of a circle having an inner radius $R_1$ and outer radius $R_2$. The inner radius $R_1$ is that of the circle obtained by juxtaposing the bases C, D, $C_1$, $D_1$, $C_2$, $D_2$, etc., of the elements 30, 31, 32, etc.

Then the elastic material is poured or injected and caused to polymerise or vulcanise in the mass and over the surfaces of the elements 30, 31.

This elastic material penetrates and solidifies not only in the windows in the elements in such a way as to form a continuous bead in all the elements but likewise enters the gaps between the elements. Thus, the elastic material constitutes corner shaped parts $ADB_1$, $A_1$, $D_1$, $B_2$, etc., which tend to give the belt a natural form of a circular ring. This method of moulding the elastic material onto the elements is applicable both to elements 4' and to elements 4".

This method permits of two alternatives:

According to the first alternative, the elements 4' are connected by their spindles prior to being placed in the mould or after they have been placed in position but before the elastic material is introduced. In the case of elements 4", the spindles may be placed in position when the elements 4" are in the mould.

According to the second alternative, the spindles are only placed in position after production of the elastic component and after the mould has been removed. This alternative makes it possible to remove all the fins which might hamper the movement of the joints.

To order to carry out moulding with prestressing, for the same elements which are now designated in FIG. 6 by references 40, 41, 42 . . . a mould is used in which the housing is a circular ring of radii $R'_1$, $R'_2$ less than the radii $R_1$, $R_2$ of the mould according to the preceding method.

The reduction in radii is made possible by a diminution of the shape of the elements at the level of their sides CD, $C_1 D_1$ ; $C_2 D_2$ . . . and their corresponding faces with the exception of the faces of the flanges. This diminution has been illustrated diagrammatically by the contour A B E F, $A_1 B_1 E_1 F_1$, $A_2 B_2 E_2 F_2$, etc., it being however stressed that this reduction is intended only to permit of a particular type of moulding, the articulation between the elements when the belt is taken out of the mould always being carried out at the peaks CD, $C_1 D_1$, $C_2 D_2$ ... of the rectangular contours.

To facilitate comprehension and by convention, it should be noted that FIG. 6 shows this dimuntion in greatly exaggerated form.

Under these conditions, the elastic material is introduced into the mould. This material cannot enter the corners defined between the faces of the flanges.

Once the elastic material has hardened, the belt may be removed from the mould.

The belt is then placed on a sleeve of radius $R_1$ in order to lengthen the inner circle of the belt and to produce coincidence between the peaks (D and $C_1$) ; ($D_1$ and $C_2$), etc., for positioning of the spindles.

The result is prestressing in the elastic component, which tends to deform the belt and to cause the faces of the flanges to be applied against one another.

The method of manufacture described hereinabove is applicable both to an element as shown in FIGS. 2 and 3 and to an element as shown in FIGS. 4 and 5.

The double-action belt according to the invention makes it possible during one and the same movement to transmit compression stresses in the part of the belt which is subject to compression stresses and traction stresses in the part of the belt which is subject to traction stresses. The result is better balancing of the stresses and hence a more regular functioning and greater viability of the belt for use in a speed varying device comprising a pulley of variable useful diameter.

I claim:

1. A double-action belt for a speed varying device of the kind having pulleys of variable diameter, the double-action belt comprising
   (i) a plurality of rigid trapezoidal elements, each element having the base of its trapezoid parallel to a longer side, the elements being articulated one to another at their bases, each element having an opening therethrough situated substantially centrally within the trapezoid,
   (ii) an elastic member extending through the central openings in the trapezoidal elements and forming a closed loop with the trapezoidal elements strung along the loop, each trapezoidal element being attached to the elastic member wherby the trapezoidal element is held captive by the elastic member, and
   (iii) each trapezoidal element at said longer side of the trapezoid having flanges extending from the faces thereof whereby the central portions of contiguous trapezoidal elements are spaced apart by abutment of the flanges when the contiguous elements are pressed together.

2. The double-action belt according to claim 1, wherein;
   the articulated bases of the elements are pivotally interlocked by spindles disposed in aligned passages in the bases of the elements.

3. The double-action belt according to claim 1, wherein
   the bases of the elements have semicircular channels in which the spindles are received that enable the elements to articulate.

4. The double-action belt according to claim 1, wherein
   the portion of each element between the base of the trapezoid and the flanges at the longer side is of reduced thickness.

* * * * *